(12) United States Patent
Norton

(10) Patent No.: US 10,788,383 B2
(45) Date of Patent: Sep. 29, 2020

(54) POWER VECTOR SENSOR DEVICE AND BICYCLE HAVING THE SAME

(71) Applicant: CHEEVC LTD, Aberdour, Scotland (GB)

(72) Inventor: Kenneth Hamilton Norton, Shenzhen (CN)

(73) Assignee: CHEEVC LTD, Aberdour, Scotland (GB)

( * ) Notice: Subject to any disclaimer, the term of this patent is extended or adjusted under 35 U.S.C. 154(b) by 550 days.

(21) Appl. No.: 16/068,836

(22) PCT Filed: Aug. 15, 2014

(86) PCT No.: PCT/CN2014/084481
§ 371 (c)(1),
(2) Date: Jul. 9, 2018

(87) PCT Pub. No.: WO2016/023220
PCT Pub. Date: Feb. 18, 2016

(65) Prior Publication Data
US 2019/0017889 A1    Jan. 17, 2019

(51) Int. Cl.
*G01L 5/22* (2006.01)
*B62M 6/50* (2010.01)
(Continued)

(52) U.S. Cl.
CPC ............. *G01L 5/225* (2013.01); *B60L 15/20* (2013.01); *B60L 50/20* (2019.02); *B60L 50/52* (2019.02);
(Continued)

(58) Field of Classification Search
CPC ....... G01L 5/225; G01L 3/242; G01L 5/0042; B62M 6/50; B62M 6/40
See application file for complete search history.

(56) References Cited

U.S. PATENT DOCUMENTS 6,644,135 B1 * 11/2003 Kishimoto ............... B62M 6/45
73/862.338
8,011,242 B2 * 9/2011 O'Neill ................... G01L 3/242
73/379.01
(Continued)

FOREIGN PATENT DOCUMENTS

CN       102072792 A     5/2011
CN       102494819 A     6/2012
(Continued)

OTHER PUBLICATIONS

International Search Report and Written Opinion issued in PCT/CN2014/084481, dated May 19, 2015; ISA/CN.
(Continued)

*Primary Examiner* — Kevin Hurley
*Assistant Examiner* — Michael R Stabley
(74) *Attorney, Agent, or Firm* — Harness, Dickey & Pierce, P.L.C.

(57) ABSTRACT

A bicycle (10) includes a frame (25) having a bottom bracket (40), a crankset (35) attached to the bottom bracket (40), a pedal (50) coupled to the crankset (35) and operable to propel the bicycle (10) in response to a force acting on the pedal (50). The bicycle further includes a first bicycle component acted upon by the pedal (50) in response to the force, a second bicycle component coupled and responsive to the first bicycle component, and a power vector sensor (85) coupled to and positioned between the first bicycle component and the second bicycle component, and the power vector sensor (85) includes a sensor element (100) to sense a force transferred from the first bicycle component to the second bicycle component and indicative of the force acting on the pedal (50).

16 Claims, 10 Drawing Sheets

(51) Int. Cl.
  *G01L 1/22* (2006.01)
  *G01L 3/24* (2006.01)
  *B60L 15/20* (2006.01)
  *G01L 5/00* (2006.01)
  *B60L 50/52* (2019.01)
  *B60L 50/20* (2019.01)
  *B60L 50/60* (2019.01)
  *B62K 19/34* (2006.01)
  *G01L 3/26* (2006.01)

(52) U.S. Cl.
  CPC ............. *B60L 50/66* (2019.02); *B62K 19/34* (2013.01); *B62M 6/50* (2013.01); *G01L 1/2237* (2013.01); *G01L 3/242* (2013.01); *G01L 5/0042* (2013.01); *G01L 5/22* (2013.01); *B60L 2200/12* (2013.01); *B60L 2250/26* (2013.01); *G01L 3/26* (2013.01); *Y02T 10/645* (2013.01); *Y02T 10/7005* (2013.01); *Y02T 10/705* (2013.01); *Y02T 10/72* (2013.01); *Y02T 10/7275* (2013.01)

(56) References Cited

U.S. PATENT DOCUMENTS

| | | | |
|---|---|---|---|
| 8,327,723 B2 | 12/2012 | Roudergues et al. | |
| 8,584,529 B2* | 11/2013 | Fisher | A63B 22/0046 |
| | | | 73/782 |
| 8,800,389 B2* | 8/2014 | Tetsuka | G01L 5/225 |
| | | | 73/862.621 |
| 8,881,608 B2* | 11/2014 | Tetsuka | B62M 3/00 |
| | | | 73/862.621 |
| 9,322,725 B2 | 4/2016 | Tetsuka et al. | |
| 9,423,310 B2* | 8/2016 | Tetsuka | G01L 5/13 |
| 9,496,769 B2* | 11/2016 | Tetsuka | G01L 3/02 |
| 2007/0137307 A1 | 6/2007 | Gruben et al. | |
| 2008/0071436 A1* | 3/2008 | Dube | B62M 6/45 |
| | | | 701/22 |
| 2011/0067503 A1 | 3/2011 | Roudergues et al. | |
| 2013/0205945 A1* | 8/2013 | Hosaka | B62M 6/50 |
| | | | 74/594.2 |
| 2014/0039741 A1* | 2/2014 | Tanaka | B60L 15/20 |
| | | | 701/22 |
| 2014/0060212 A1 | 3/2014 | Tetsuka et al. | |

FOREIGN PATENT DOCUMENTS

| | | |
|---|---|---|
| CN | 103674384 A | 3/2014 |
| CN | 103803005 A | 5/2014 |
| GB | 2482696 A | 2/2012 |
| KR | 20120125003 A | 11/2012 |

OTHER PUBLICATIONS

International Preliminary Report on Patentability issued in PCT/CN2014/184481, dated Feb. 21, 2017.

* cited by examiner

US 10,788,383 B2

POWER VECTOR SENSOR DEVICE AND BICYCLE HAVING THE SAME

CROSS-REFERENCE TO RELATED APPLICATIONS

This application is a 371 U.S. National Stage of International Application No. PCT/CN2014/084481, filed Aug. 15, 2014 and published in English as WO 2016/023220 A1 on Feb. 18, 2016. The entire disclosure of the above-identified application is incorporated herein by reference.

BACKGROUND

The present application relates to bicycles, and particularly relates to a bicycle including a power vector sensor device for measuring forces applied to pedals of the bicycle.

Pedal power is the transfer of energy from a human source through the use of a pedal and a crank system. The pedal power is most commonly used for transportation and has been used to propel bicycles for over a hundred years.

The power level that a human being is able to produce through pedaling depends on the physical constitution of a pedaler and the riding time. If the pedaler is required to pedal the bicycle for hours at one time, 75 watts mechanical power is generally considered as the limit amount for a healthy non-athlete, and a healthy athletic person under the same condition might produce up to twice the amount. A pedal-based power vector system offers direct measurement of left-right specific power output which would be useful in correcting pedaling inefficiencies and imbalances, in training to recover from injury, or in training to improve power output.

SUMMARY

In one aspect, the present application provides a bicycle including a frame having a bottom bracket, a pedal, a crankset and a power vector sensor coupled between the pedal and the crankset. The pedal, coupled to the crankset, is used to propel the bicycle in response to a force applied to the pedal. The power vector sensor is provided to sense a force transferred from the pedal to the crankset and indicative of the force applied to the pedal.

In another aspect, the present application provides a static-bike including a frame having a pedal, a crankset and a power vector sensor coupled between the pedal and the crankset. The pedal, coupled to the crankset, is used to spin a flywheel in response to a force applied to the pedal. The power vector sensor is provided to sense a force transferred from the pedal to the crankset and indicative of the force applied to the pedal.

In another aspect, the present application provides a power vector sensor for measuring a force applied to a pedal of a bicycle. The power vector sensor has a main body, and the main body includes a first side provided with a threaded shaft configured to be coupled with a crank arm, and a second side provided with a threaded aperture configured to be coupled with a pedal spindle. A sensor element is provided on the second side of the main body of the power vector sensor to determine directional force and corresponding power applied by a rider to the pedal.

In another aspect, the present application provides a pedalec including a frame having a pedal, a crankset and a power vector sensor coupled between the pedal and the crankset. The pedal, coupled to the crankset, is used in conjunction with the electric motor to propel the bicycle in response to a force applied to the pedal. The power vector sensor is provided to sense a force transferred from the pedal to the crankset and adjust accordingly the amount of assist provided by the electrical motor of the pedalec. Additionally, the power vector sensor is used to balance variations in the power input caused by the null points of the crankset during pedal rotation, resulting in smoother ride for the rider.

Other aspects of the present application will become apparent in conjunction with the detailed description and accompanying drawings.

Before any embodiments of the present application are explained in detail, it is to be understood that the present application is not limited in its application to the details of construction and the arrangement of components set forth in the following description or illustrated in the following drawings. The present application is capable of other embodiments and of being carried out in various ways.

DETAILED DESCRIPTION

The present application is further described in conjunction with the drawings.

Figure 1:
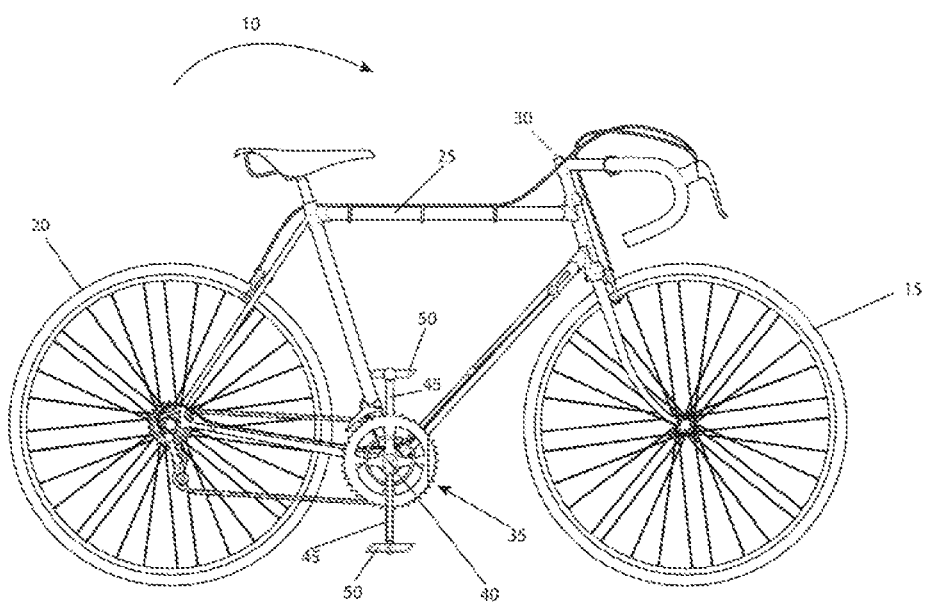
FIG. 1 is a side view of a bicycle including a crankset, a pedal and a power vector sensor according to the present application.
Figure 2:
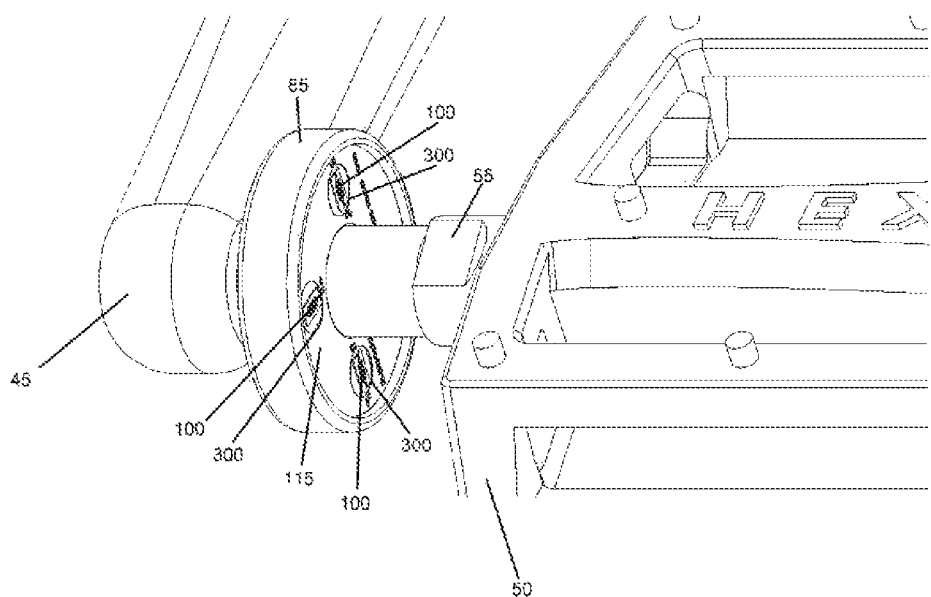
FIG. 2 is a perspective view of an assembly including a crank arm, the power vector sensor and a pedal according to an embodiment of the present application.
Figure 3:
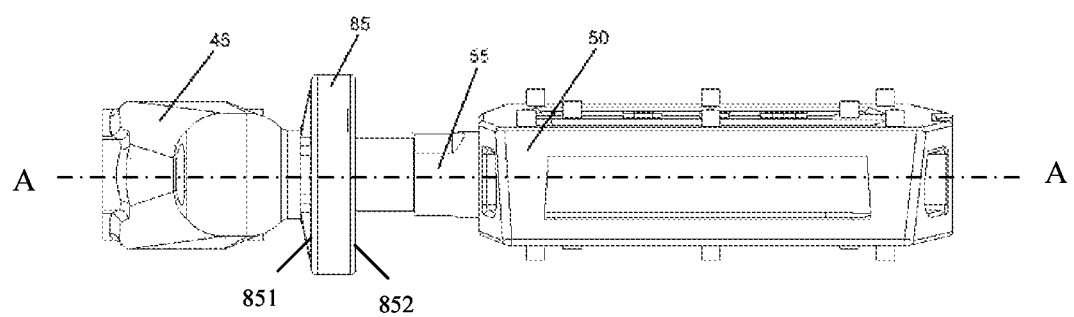
FIG. 3 is a front view of the assembly shown in FIG. 2.

According to an embodiment of the present application, referring to FIG. 1, a bicycle 10 includes a front wheel 15, a rear wheel 20, a frame 25, a steering assembly 30, and a crankset 35 attached to a bottom bracket 40 of the frame 25. The crankset 35 includes opposite crank arms 45 each having a central end coupled to a central axis of the crankset 35 and a distal end, and pedals 50 are attached to the distal ends of the crank arms 45 via pedal spindles 55 to allow a rider to rotate the crankset 35 and propel the bicycle 10.

Figure 4:
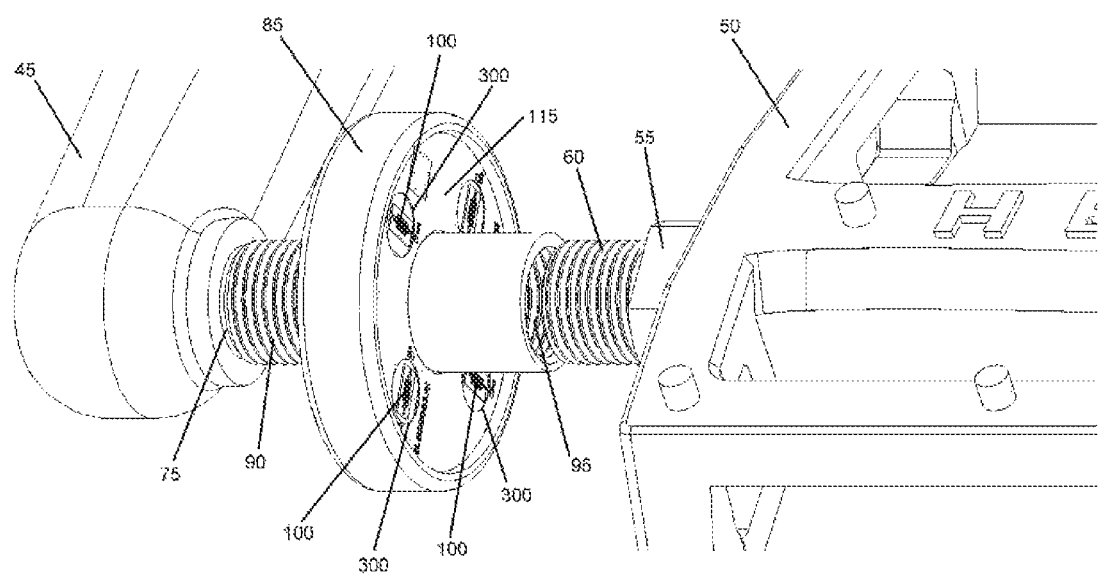
FIG. 4 is an exploded view of the assembly of FIG. 2.
Figure 6:
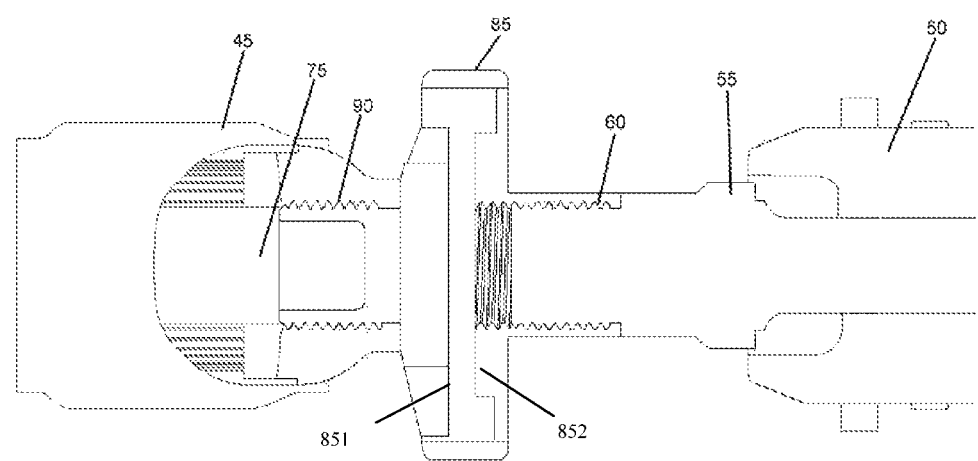
FIG. 6 is a sectional view of the assembly including the crank arm, the power vector sensor and the pedal taken along line A-A of FIG. 3.

Referring to FIGS. 4 and 6, each pedal spindle 55 has a shaft 60 that is normally disposed in a pedal threaded hole 75 at the distal end of the crank arm 45. The pedal 50 rotates about the pedal spindle 55 so that the pedal 50 may move with the rider's foot.

Referring to FIGS. 2, 3, 4 and 6, a power vector sensor 85 is positioned between the crank arm 45 and the pedal 50 to determine the directional forces and the corresponding power applied by the rider to the pedal 50.

In particular, the power vector sensor 85 is disposed in the pedal threaded hole 75 of the crank arm 45, and the pedal spindle 55 is disposed in the power vector sensor 85, so that the power vector sensor 85 is held in engagement with the crank arm 45 and the pedal 50.

With reference to FIGS. 2 to 6, the power vector sensor 85 is a single piece having a main body, the main body includes a first side 851 provided with a threaded shaft 90 that couples with the pedal threaded hole 75 of the crank arm 45, and a second side 852 provided with a hollow shaft having a threaded aperture 95 to couple with a shaft 60 of the pedal spindle 55.

The power vector sensor 85 is of a circular-shaped structure, in this embodiment, that has a threaded shaft 90 on one side for coupling with the pedal threaded hole 75 of the crank arm 45 and a threaded aperture 95 on the other side for coupling with the threaded shaft 60 of the pedal spindle 55. The threaded shaft 90 of the power vector sensor 85 is torqued into the pedal threaded hole 75 of the crank arm 45, and the threaded shaft 60 of the pedal spindle 55 is subsequently torqued into the threaded aperture 95 of the power vector sensor 85. It could equally be coupled conversely.

Figure 7:
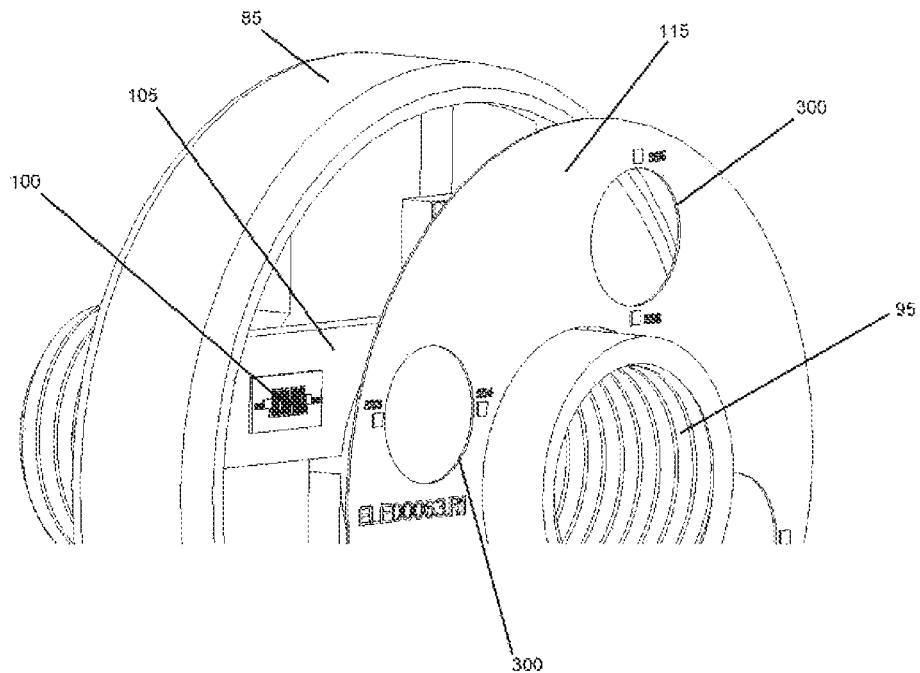
FIG. 7 is a schematic view illustrating a portion of a circuit board of the power vector sensor according to an embodiment of the present application.
Figure 8:
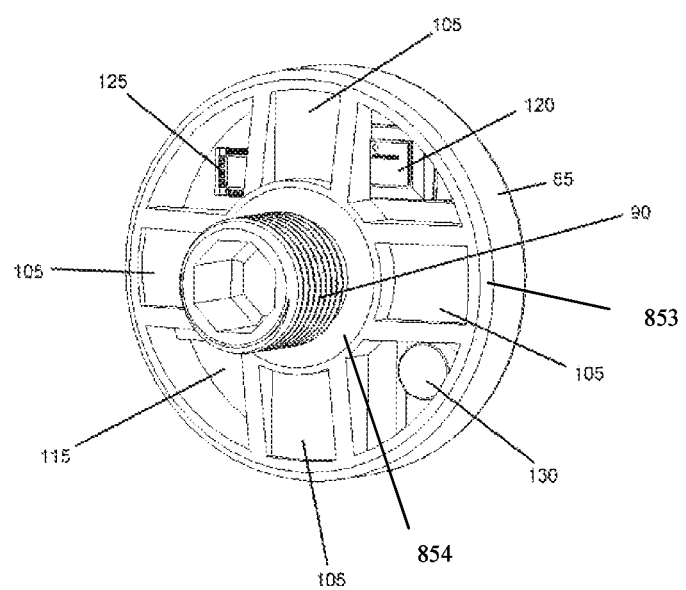
FIG. 8 is another perspective view of the power vector sensor according to the embodiment of the present application.

Further referring to FIGS. 7 and 8, in one embodiment, the main body of the power vector sensor 85 includes an outer portion 853, a central portion 854, and four beams 105 uniformly distributed along a circumferential direction of the power vector sensor 85 and extending from the central portion 854 toward the outer portion 853. The number of the beams 105 is not limited to four, but may be selected according to practical requirements. The beam 105 is flexible and is capable of being deformed when a force is applied to the power vector sensor 85. The threaded shaft 90 is formed on the central portion 854 at the first side 851 of the power vector sensor 85, and the hollow shaft having the threaded aperture 95 is formed on the central portion 854 at the second side 852 of the power vector sensor 85. Further, a circuit board 115 having a central hole is installed on the second side 852 of the power vector sensor 85, and the hollow shaft having the threaded aperture 95 passes through the central hole of the circuit board 115. The circuit board 115 may be a double sided printed circuit board, and after the central hole of the circuit board 115 slides over the hollow shaft of the power vector sensor 85, the circuit board 115 is locked in place via bonding, clips, screws, or other secure means. The circuit board 115 may be powered by a battery 130, and in an alternative embodiment of the present application, the circuit board 115 may be powered by other devices, for example an electro mechanical device, a piezo device or solar power.

Figure 5:
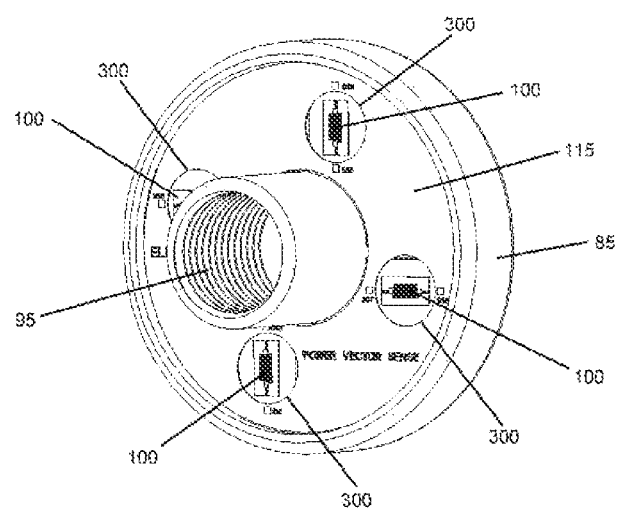
FIG. 5 is a perspective view of the power vector sensor according to the embodiment of the present application.

With reference to FIGS. 5, 7 and 8, the power vector sensor 85 also includes four sensor elements 100, it could equally include more or less sensor elements depending on the required accuracy of strain measurement. As illustrated, the power vector sensor 85 includes circumferentially spaced sensors 100, located on the four beams 105 of the power vector sensor 85. The sensors 100 can equally be placed tangentially or in any suitable configuration. As shown in FIG. 7, the circuit board 115 has four circumferentially spaced holes 300 corresponding to the four sensors 100, and the circuit board 115 is positioned on the hollow shaft having the threaded shaft 95 and the holes 300 in the circuit board 115 are aligned with the sensors 100, which allows terminals of the sensor to output signal to the circuit board 115. The sensors 100 are in electrical communication with the circuit board 115. Fewer or more than four sensors are possible.

With continued reference to FIGS. 5, 7, and 8, the power vector sensor 85 includes an inclinometer 120 that determines the relative crank rotation and thus deriving the velocity for determining the magnitude and direction of acceleration of the pedal 50 and a transmitter 125 that can communicate with a remote device (not shown). In another embodiment, an accelerometer could be used to determine the relative crank rotation and velocity although it would be necessary to define a zero reset position.

The power vector sensor 85 is coupled to the crank arm 45 with a predetermined amount of force. The pedal 50 is coupled to the power vector sensor 85 with a predetermined amount of force. Generally, the power vector sensor 85 determines the vector forces applied to the pedal 50, when the rider engages the pedal 50 to move the bicycle 10 forward, as well as the tangential velocity of the pedal 50, which is determined by the inclinometer 120. In particular, the power vector sensor 85 determines the tangential force and the radial force applied to the pedal 50 and determines the overall power of the rider based on the amount and direction of the forces and tangential pedal velocity.

Figure 9:
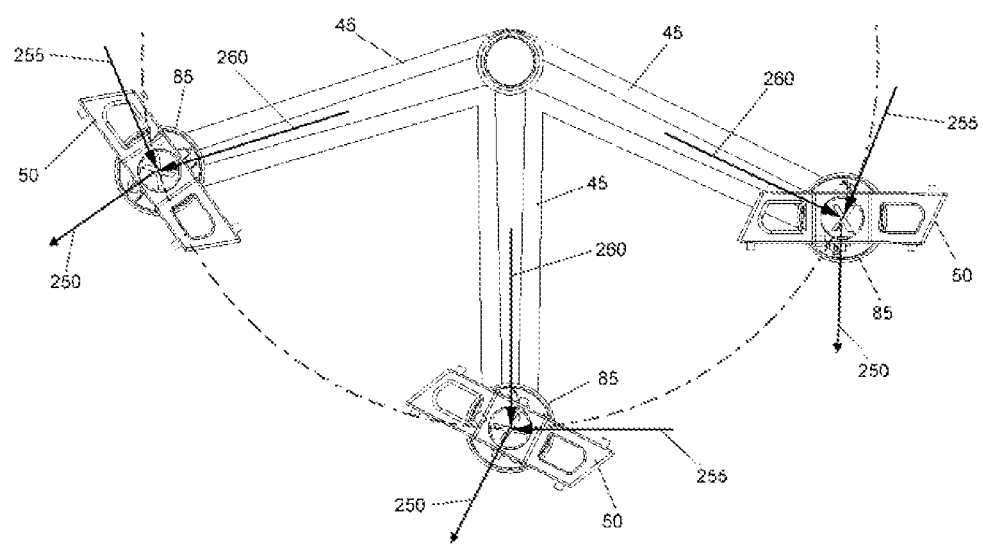
FIG. 9 is a schematic view illustrating the crank arm, the power vector sensor, and the pedal in three positions and associated vector forces applied to the pedal according to the embodiment of the present application.

With reference to FIG. 9, when a rider pushes or pulls on the pedal 50, depending on the radial orientation of the pedal 50 relative to the bicycle 10, a force vector 250 associated with the rider's engagement of the pedal 50 has a useful tangential force vector 255 along the path of the pedal 50 and a radial force vector 260 in a direction along the crank arm 45. The amount of the tangential and radial force vectors 255 and 260 are determined by the power vector sensor 85 based on deflection of the beams 105.

When force is applied to the pedal 50, the resulting force is transferred from the pedal spindle 55 to the crank arm 45 via the power vector sensor 85, and this force deflects the pedal spindle 55 a small amount, which in turn deflects the hollow shaft having the threaded aperture 95 of the power vector sensor 85, and the deflection of the hollow shaft in turn deflects the beams 105 of the power vector sensor 85. The force applied to the pedal 50 rotates the crankset 35 to propel the bicycle forward. Generally, a substantial portion of the force acting on the pedal 50 is directly transferred to the crank arm 45 through the pedal spindle 55 and the power vector sensor 85. In the device presented herein, all the force is transmitted through the beams 105 of the power vector sensor 85.

Deflection of the pedal spindle 55 causes the hollow shaft having the threaded aperture 95 to deflect which in turn causes the beams 105 of the power vector sensor 85 to deflect. The deflection of the beams 105 is detected by the sensors 100 and is used to determine the corresponding tangential and radial forces 255 and 260 being applied to the pedal 50.

In particular, the sensors 100 sense the force transferred from the pedal spindle 55 to the crank arm 45 by detecting the deflection of the beams 105. In one embodiment, the sensor 100 is a strain gauge attached to the beam 105. When the beam 105 is deflected, the resistance of the strain gauge changes accordingly, thus the deflection of the beam 105 may be determined by measuring the change in resistance of the strain gauge. In order to establish a relationship between resistance and deflection, the strain gauge is calibrated by applying known deflections, and the corresponding values of resistance are measured. A curve fit of this calibration data generates a calibration curve, which provides an equation that relates resistance and deflection. The sensor 100 may also employ other kinds of strain measuring instruments, which is not limited herein.

The directional forces 255, 260 detected by the sensors 100 are then communicated to the circuit board 115, which determines the tangential velocity of the pedal 50 and the corresponding power of the rider in part using the inclinometer 120. This information can then be transferred to the remote device (not shown). Additionally, the inclinometer 120 can also provide cadence data which may also be transferred to the remote device (not shown).

The power vector sensor 85 provides a separate device that can be used universally with existing crank arms 45 and pedals 50 without any modification of the crank arms 45 and pedals 50, and during setup, the rider simply has to set the pedals in a 'null' position to provide the inclinometer with a reference. The power vector sensor 85 may be attached to one or both sides of the bicycle 10 so that the bidirectional forces associated with pressure on the pedal 50 may be determined for the rider's left and/or right leg. As a result, separate and accurate measurements of the power generated by the rider's left and right legs may provide valuable data that may be used to evaluate and improve the rider's ability.

The power vector sensor 85 when fitted to a pedalec may be used to determine the amount of pedal assist required by the rider. In addition, the power vector sensor may be used to detect the null points during the rotation of the crankset 35 and adjust the power required accordingly to maintain a level power output resulting in a smoother ride for the rider.

Figure 10:
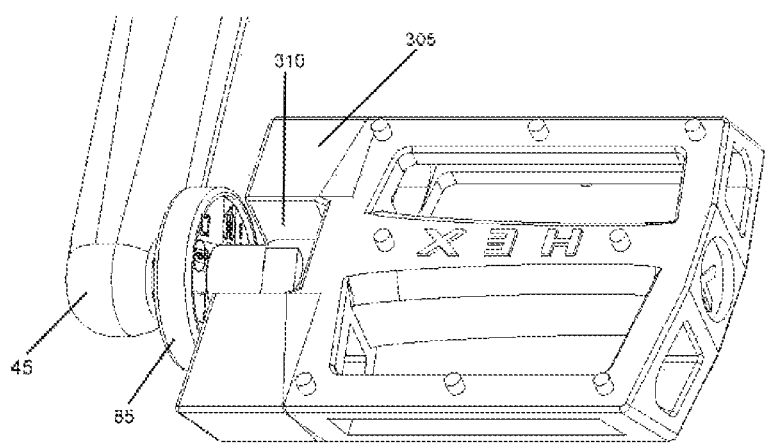
FIG. 10 is a schematic view illustrating an optional offset platform pedal to accommodate the power vector sensor according to an embodiment of the present application.

When being fitted between the pedal 50 and the crank arm 45, the power vector sensor 85 creates a pedal offset, which increases a distance between the pedal 50 and the crank arm 45 due to the width of the power vector sensor 85. With reference to FIG. 10, there is an option to provide an offset platform pedal 305 to accommodate the power vector sensor 85 to remove the pedal offset created by the power sensor vector 85 when used with standard pedals 50. The offset platform pedal 305 has a recess 310 for accommodating a portion of the power vector sensor 85.

The embodiments described hereinabove are only preferred embodiments of the present application, and should not be interpreted as limitation to the scope of the present application. Any modifications, equivalent replacements and improvements made within the principle of the present application are also deemed to fall into the scope of the present application defined by the claims.

The invention claimed is:

1. A bicycle comprising a frame having a bottom bracket, a crankset attached to the bottom bracket, a pedal coupled to the crankset and operable to propel the bicycle in response to a force acting on the pedal;
   a first bicycle component acted upon by the pedal in response to the force;
   a second bicycle component coupled and responsive to the first bicycle component; and
   a power vector sensor coupled to and positioned between the first bicycle component and the second bicycle component, and the power vector sensor comprises a sensor element to sense a force transferred from the first bicycle component to the second bicycle component and indicative of the force acting on the pedal; and
   wherein the pedal comprises a pedal spindle defining the first bicycle component and the crankset comprises a crank arm defining the second bicycle component, and the pedal spindle has a shaft disposed in the power vector sensor, and the power vector sensor is responsive to the force transferred from the pedal spindle to the crank arm, and the power vector sensor has a shaft disposed in the crank arm, and the power vector sensor is coupled between the pedal and the crank arm; and
   wherein, the power vector sensor is a single piece coupled to and positioned between the crank arm and the pedal, and the power vector sensor comprises circumferentially spaced beams.

2. The bicycle according to claim 1, wherein the force acting on the pedal is transferred directly to the second bicycle component through the first bicycle component.

3. The bicycle according to claim 1, wherein the force transferred from the first bicycle component to the second bicycle component is transferred through the power vector sensor.

4. The bicycle according to claim 1, wherein the sensor element is a first sensor element, the power vector sensor further comprises second, third and fourth sensor elements, wherein the first sensor element, the second sensor element, the third sensor element and the fourth sensor element are equally spaced apart on the beams of the power vector sensor.

5. The bicycle according to claim 4, wherein the beams of the power vector sensor are flexible in response to the force applied to the pedal, and the sensor elements are configured to detect deflection of the beams of the power vector sensor indicative of the force applied to the pedal.

6. The bicycle according to claim 4, further comprising a detector in communication with the first, second, third and fourth sensor elements to detect a load deflection, which is indicative of the force applied to the pedal.

7. The bicycle according to claim 6, wherein the power vector sensor further comprises an inclinometer configured to determine the rotational position and velocity of the pedal, and the detector comprises a circuit board in electrical communication with the inclinometer.

8. The bicycle according to claim 1, wherein the sensor element comprises at least one of a strain gauge, an inclinometer, or an accelerometer.

9. The bicycle according to claim 1, wherein each of the pedals is an offset platform pedal having a recess for accommodating the power vector sensor.

10. The bicycle according to claim 1, wherein the bicycle is a pedalec and the power vector sensor is configured to detect a force input by the rider which is then used to determine a level of assist to give the rider via an electric motor.

11. The bicycle according to claim 1, wherein the bicycle is a pedalec and the power vector sensor is configured to detect a null point of the crankset rotation and adjust a level of assist to give the rider a smooth seamless ride.

12. A power vector sensor device for measuring a force applied to a pedal of a bicycle, comprising a main body, wherein the main body comprises a first side and a second side, and a sensor element is provided on the second side of the power vector sensor device to determine the force applied to the pedal, wherein the first side of the power vector sensor device is provided with a threaded shaft configured to be coupled with a crank arm of the bicycle, and the second side of the power vector sensor device is provided with a hollow shaft having a threaded aperture configured to be coupled with a pedal spindle of the bicycle.

13. A power vector sensor device for measuring a force applied to a pedal of a bicycle, comprising a main body, wherein the main body comprises a first side and a second side, and a sensor element is provided on the second side of the power vector sensor device to determine the force applied to the pedal, wherein the main body comprises circumferentially spaced beams, which are flexible in response to the force applied to the pedal, and the sensor element is configured to detect deflection of the beams of the power vector sensor device indicative of the force applied to the pedal.

14. The power vector sensor device according to claim 13, wherein the sensor element is a first sensor element, the power vector sensor device further comprises second, third and fourth sensor elements, wherein the first sensor element, the second sensor element, the third sensor element and the fourth sensor element are equally spaced apart on the beams of the power vector sensor device.

15. The power vector sensor device according to claim 13, wherein the power vector sensor device further comprises a circuit board in electrical communication with the sensor elements.

16. The power vector sensor device according to claim 15, further comprising an inclinometer configured to determine rotational position and velocity of the pedal, wherein the inclinometer is in electrical communication with the circuit board.

* * * * *